UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

DYES AND MANUFACTURE THEREOF.

1,251,369.  Specification of Letters Patent.  Patented Dec. 25, 1917.

No Drawing.  Application filed January 21, 1915.  Serial No. 3,606.

*To all whom it may concern:*

Be it known that I, HEINRICH HEIMANN, a citizen of the German Empire, residing at Dessau, Germany, (my post-office address being Friedrich-Schneiderstrasse 63, Dessau, Germany,) have invented certain new and useful Improvements in Dyes and Manufacture Thereof, of which the following is a specification.

In a co-pending application Serial No. 3,605, Series of 1915, I have described and claimed new sulfurized dyes obtainable by the action of sulfur upon a mixture of amino-, diamino-, nitrooxy- and aminooxy- azo-compounds with a C-alkylated diamin of the benzene- and naphthalene-series. Now in the present application I describe and claim new dyes which are to be obtained by the action of sulfur upon a mixture of nitroamino-azo-compounds with a C-alkylated diamin of the aromatic series. Thus for instance according to my present application a mixture of meta-toluylene-diamin, para-toluylenediamin or xylylenediamin, etc., or of a N-aryl-derivative of such diamins, such as for instance a naphthyl-meta-toluylenediamin, with a nitrobenzene-azo-naphthylamin may be acted upon with sulfur. Thus are obtained dyes of a beautiful tint fast to washing and boiling diluted acids; the tints of these dyes upon textile fiber are for instance a very beautiful yellow olive or a beautiful brown.

The following examples may serve to illustrate my invention, the parts being by weight:

(1). 16 parts of meta-toluylenediamin, 20 parts of para-nitrobenzene-azo-alpha-naphthylamin and 100 parts of sulfur are heated together to say 180–220° C. during about 2–4 hours; the mass is then further heated during about 4–8 hours to say 220–260° C. The melt may be treated as given above in order to obtain and purify the new dye which produces on unmordanted cotton a very beautiful yellow olive fast to washing and to diluted acid.

In a similar manner from a mixture of meta-toluylenediamin with para-nitrobenzene-azo-beta-naphthylamin a dye can be obtained which upon textile fiber produces a beautiful yellowish brown is likewise fast to washing and to boiling diluted acids.

(2). 10 parts of meta-toluylenediamin together with 12 parts of meta-nitrobenzene- azo-alpha-naphthylamin and 4–8 parts of sulfur are heated during about 1–3 hours to say 220–240° C., whereupon the mass is further heated, say 1 hour to 240–260° C. and another 1 hour to say 260–280° C. The melt thus obtained is made soluble by heating it with crystallized sodium sulfid, say 12 parts of this body, at 120° C.; the dye may then be separated as usual. The new coloring matter thus produced yields on unmordanted cotton a beautiful brown tint which is fast to washing and to diluted boiling acids. In the dry state when pulverized it forms a black powder insoluble in the usual organic solvents and in concentrated sulfuric acid. It is soluble in fuming sulfuric acid of 25 per cent. $SO_3$ to a black-brown solution and dissolves in an alkaline hydrosulfite solution to a brown solution.

It is obvious that the present invention is not limited to the foregoing examples or to the details given therein.

First it is to be stated that the shade of the dyes obtainable according to the present invention depends also upon the proportions of the ingredients as well as upon the other special conditions of reaction, such as for instance the temperature of the reaction and the duration of heating. Furthermore instead of a nitrobenzene-azo-naphthylamin body an aminobenzene-azo-naphthylamin or an acidyl-aminobenzene-azo-naphthylamin may be used, which aminobenzene-azo-naphthylamin compounds for the purpose of my present invention I regard as equivalents of the corresponding nitro compounds.

Having now described my invention what I claim is,—

1. New sulfurized dyes, which can be obtained by the action of sulfur upon a mixture of a nitroamino-derivative of the benzene-azo-naphthalene-series with a C-alkylated diamin of the benzene series, the tints of which on textile fiber vary, generally speaking, from olive to brown, the shades of said dyes upon unmordanted cotton being, generally speaking, very fast to washing and to diluted boiling acids, and said dyes being insoluble or nearly insoluble in the usual organic solvents and in concentrated sulfuric acid, but easily soluble in an aqueous solution of an alkali metal sulfid or in an alkaline solution of a hydrosulfite.

2. New sulfurized dyes, which can be obtained by the action of sulfur upon a mixture of a nitrobenzene-azo-naphthylamin with a toluylenediamin, the tints of which upon textile fiber vary, generally speaking, from olive to brown, these tints being, generally speaking, very fast to washing and to boiling diluted acids, which dyes in the dry state when pulverized form dark powders insoluble or nearly insoluble in the usual organic solvents and in concentrated sulfuric acid, but easily soluble in an aqueous solution of an alkali metal sulfid or in an alkaline solution of a hydrosulfite.

3. A new sulfurized dye, which can be obtained by the action of sulfur upon a mixture of meta-nitrobenzene-azo-alpha-naphthylamin with meta-toluylenediamin, which dye in the dry state when pulverized forms a black powder insoluble in the usual organic solvents and in concentrated sulfuric acid, but soluble in a fuming sulfuric acid of 25% $SO_3$ to a black brown solution, said dye being readily soluble in an aqueous solution of an alkali sulfid and in an alkaline hydrosulfite solution to a brown solution, and which new dye produces on unmordanted cotton from a dye-bath containing an alkali metal sulfid a beautiful brown tint fast to washing and to boiling diluted acids.

4. The hereinbefore-described manufacture of new sulfurized dyes by acting with sulfur upon a mixture of a nitroamino-azo-compound of the benzene-azo-naphthalene-series with a C-alkylated diamin of the benzene series.

5. The hereinbefore-described manufacture of new sulfurized dyes by acting with sulfur upon a mixture of a nitrobenzene-azo-naphthylamin with meta-toluylenediamin.

6. The hereinbefore-described manufacture of a new sulfurized dye by acting with sulfur upon a mixture of meta-nitrobenzene-azo-alpha-naphthylamin with meta-toluylenediamin.

In testimony whereof I have hereunto set my hand in presence of two subscribing witnesses.

HEINRICH HEIMANN.

Witnesses:
ARTHUR REILLY,
L. OEHLMANN.